US010007597B2

(12) United States Patent
Barnett et al.

(10) Patent No.: US 10,007,597 B2
(45) Date of Patent: Jun. 26, 2018

(54) SOFTWARE TESTING MANAGEMENT (71) Applicant: American Express Travel Related Services Company, Inc., New York, NY (US)

(72) Inventors: Lee Barnett, Phoenix, AZ (US); Krista Freiland, Phoenix, AZ (US); Satish Jayaraman, Phoenix, AZ (US); Amit Jhaamb, Haryana (IN); Manish Joon, Phoenix, AZ (US); Jeff Nunn, Phoenix, AZ (US)

(73) Assignee: AMERICAN EXPRESS TRAVEL RELATED SERVICES COMPANY, INC., New York, NY (US)

(*) Notice: Subject to any disclaimer, the term of this patent is extended or adjusted under 35 U.S.C. 154(b) by 49 days.

(21) Appl. No.: 15/274,988

(22) Filed: Sep. 23, 2016

(65) Prior Publication Data

US 2018/0089066 A1    Mar. 29, 2018

(51) Int. Cl.
*G06F 9/44*     (2018.01)
*G06F 11/36*    (2006.01)
*G06F 11/07*    (2006.01)

(52) U.S. Cl.
CPC ...... *G06F 11/3684* (2013.01); *G06F 11/0778* (2013.01); *G06F 11/3664* (2013.01); *G06F 11/3688* (2013.01)

(58) Field of Classification Search
CPC .......................... G06F 11/0778; G06F 11/3688
USPC ................................. 717/124; 714/37, 38.1
See application file for complete search history.

(56) References Cited

U.S. PATENT DOCUMENTS

| 7,926,038 | B2* | 4/2011 | Rossi ............... G06F 11/3688 717/124 |
| 9,679,090 | B1* | 6/2017 | Marolia ............... G06F 3/01 |
| 2006/0248405 | A1* | 11/2006 | Ponczak ........... G06F 11/3664 714/38.1 |
| 2007/0162894 | A1* | 7/2007 | Noller ............... G06F 11/3684 717/124 |
| 2007/0266165 | A1* | 11/2007 | Li ........................... G06F 8/71 709/230 |
| 2009/0199047 | A1* | 8/2009 | Vaitheeswaran .... G06F 11/3409 714/47.2 |
| 2009/0199160 | A1* | 8/2009 | Vaitheeswaran .... G06F 11/3414 717/124 |
| 2011/0012986 | A1* | 1/2011 | Shikll .................. A23B 4/002 347/241 |
| 2011/0283148 | A1* | 11/2011 | Rossi ............... G06F 11/3684 714/38.1 |
| 2013/0152047 | A1* | 6/2013 | Moorthi ............. G06F 11/368 717/124 |
| 2014/0245070 | A1* | 8/2014 | Rumble ............. G06F 11/3692 714/38.14 |

* cited by examiner

*Primary Examiner* — Phillip H Nguyen
(74) *Attorney, Agent, or Firm* — Snell & Wilmer L.L.P.

(57) ABSTRACT

A system may scan a version control repository to detect a first code and/or a first file written for a first test framework. The system may create a first test case in an SOR in response to detecting the first code and/or the first file. The system may scan the version control repository to detect a second code and/or a second file written for a second test framework with the second test framework being different from the first test framework. The system may create a second test case in the SOR in response to detecting the second code and/or the second file.

20 Claims, 5 Drawing Sheets

SOFTWARE TESTING MANAGEMENT

FIELD

This disclosure relates to systems and methods for testing software and managing software tests.

BACKGROUND

Software testing is the process of verifying and validating that a computer-based system works as expected and meets user needs. Test cases may be written to test a specific piece of software. The test cases may be used throughout development to test for desired functionality. The test cases may also be used for validation testing of changes. However, around 25% of the activities in the test case lifecycle are typically manual, time intensive activities.

As a result of the portions that are manual, many test teams are not compliant to SDLC (software development lifecycle). For example, the process of creating test cases in a system of record (SOR), along with uploading the test cases and results, may not be completed regularly by individuals using a manual approach. Similarly, a test engineer may not always open each case in the system of record and manually update the test case, associated results, and/or any attachments. Noncompliance may result in audit gaps and similar governance issues. Project team members are often reluctant to review the manual and perform time-intensive roles (e.g., tasks associated with audit compliance, testing, etc). Test cases can also be difficult to create, update, track and execute in a system of record.

SUMMARY

A system, method, and computer readable medium (collectively, the "system") is disclosed for managing test cases. The system may scan a version control repository and or a source code management (SCM) system to detect code, a test (unit or functional), and/or a first file written for a test framework. The system may create a first test case in a system of record (SOR), in response to detecting the first code, test, and/or the first file. The system may scan the version control repository and/or SCM to detect a second code, test, and/or a second file written for a second test framework with the second test framework being different from the first test framework (e.g., JUnit vs. TestNG). The system may create a second test case in the SOR in response to detecting the second code and/or the second file.

In various embodiments, the system may execute the first test case to generate a first result, and upload the first result to the SOR. The system may further capture an image and/or a video in response to executing the first test case. The system may also upload the image and/or the video to the SOR for association with the first test case. The test management system may include a tool agnostic framework configured to integrate with a plurality of test frameworks. The system may interact with the SOR using an API call. The system may further execute the first test case from a command line, a script, and/or a profile.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

The detailed description of various embodiments herein refers to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

The systems of the present disclosure may scan test automation code and perform actions without human activity or with minimal human activity. These automated actions may include creating and/or updating test cases in a system of record (SOR), mapping test cases to requirements or user stories, executing test cases and frameworks, uploading test results into the SOR, including screen shots and video as evidence to test cases in the SOR, and/or raising defects automatically in the SOR. In short, the system may be adapted to operate on all phases of testing including unit testing, system integration testing, end-to-end testing, and acceptance testing, for example. The system may improve computer operation by reducing or eliminating manual errors and seamlessly overseeing the quality assurance (QA) process with little-to-no human intervention.

Figure 1:
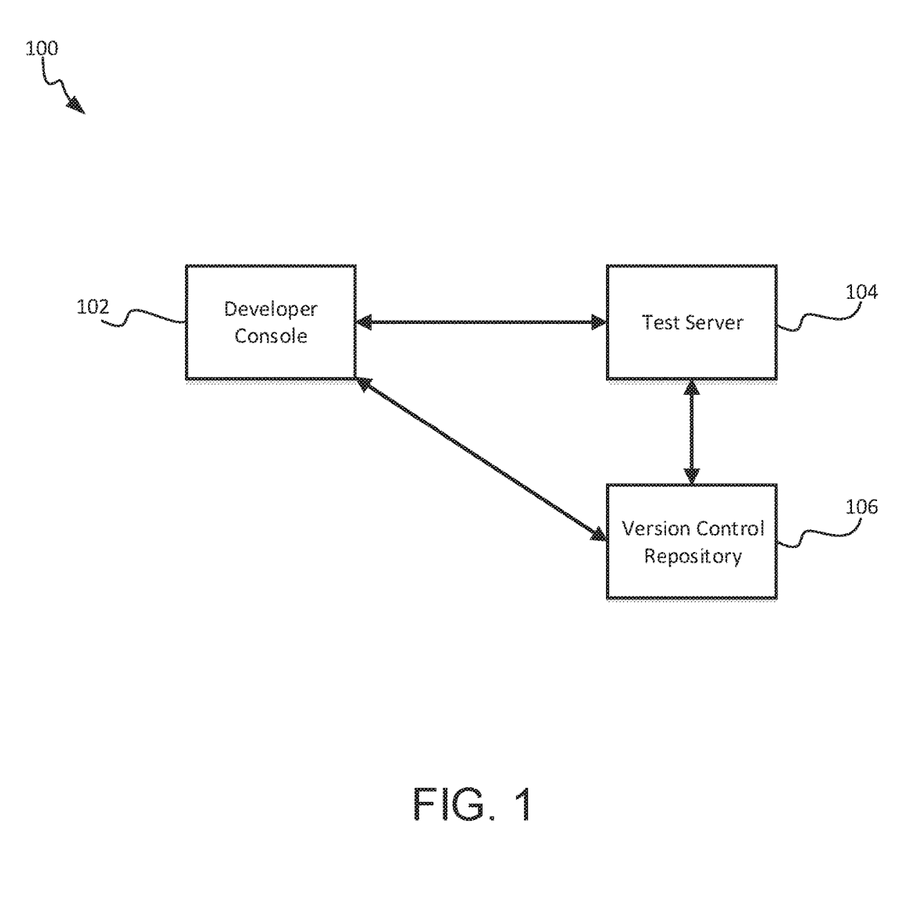
FIG. 1 illustrates an exemplary system for test case management, in accordance with various embodiments.

FIG. 1 illustrates an exemplary test management system 100, in accordance with various embodiments. Test management system 100 may include one or more developer consoles 102 in communication with test management server 104. Developer consoles 102 and test management server 104 may each include a computing device. Developer consoles 102 and test management server 104 may include computing devices operating as a computer or processor, or a set of computers/processors, although other types of computing units or systems may be used. Computing devices may include servers, laptops, notebooks, hand held computers, smart phones, tablets, wearables, or any other computing devices capable of receiving data over a network (e.g., a LAN, WAN, or the Internet).

In various embodiments, developer consoles 102 may run development tools to write test cases for execution in various testing frameworks. A testing framework is a unified system configured to execute a specific type of software test against a software product to validate operation. A testing framework may include function libraries, test data sources, object details, and reusable modules to support test case execution. The components of the testing framework act as reusable and deterministic building blocks that are used in writing test cases to simulate operation of the software product to be tested. Exemplary test frameworks include the JUnit framework, TestNG framework, QTP framework, LISA framework, and the Selenium-TestNG framework, among others. Developers and QA engineers may write and test automated code to tests functionality defined in user stories using a test framework. The test cases may execute locally on developer console 102, on test management server 104, or remotely on a separate test machine.

In various embodiments, test management server 104 includes an SOR on one or more computing devices. Test management server 104 may operate as a centralized test case management system for test case storage, management, maintenance, and/or execution. In that regard, test management server 104 may be configured to maintain various test cases written for various testing frameworks using various developer consoles 102. Test management server 104 and developer console 102 may be in electronic communication with a version control repository 106 (for example, version control repository 106 may be an SCM system) configured to maintain current and historical versions of files and source code such as, for example, git or Apache Subversion® (svn). Code written on developer consoles 102 may be stored in version control repository 106 accessible by test management server 104. Test management server 104 may access version control repository 106 to update test steps and files or attachments associated with a test case. A continuous integration server (e.g., Jenkins® with details available at https://jenkins.io/) may poll the version control repository 106 at regular intervals or in response to receiving a poll command from a developer console. In response to a developer or QA engineer committing automation code the files stored in the SCM change. Test management server 104 and/or the SOR is updated with latest test cases and/or test steps, or new testcases and/or test steps will be created based on the changes done.

Figure 2:
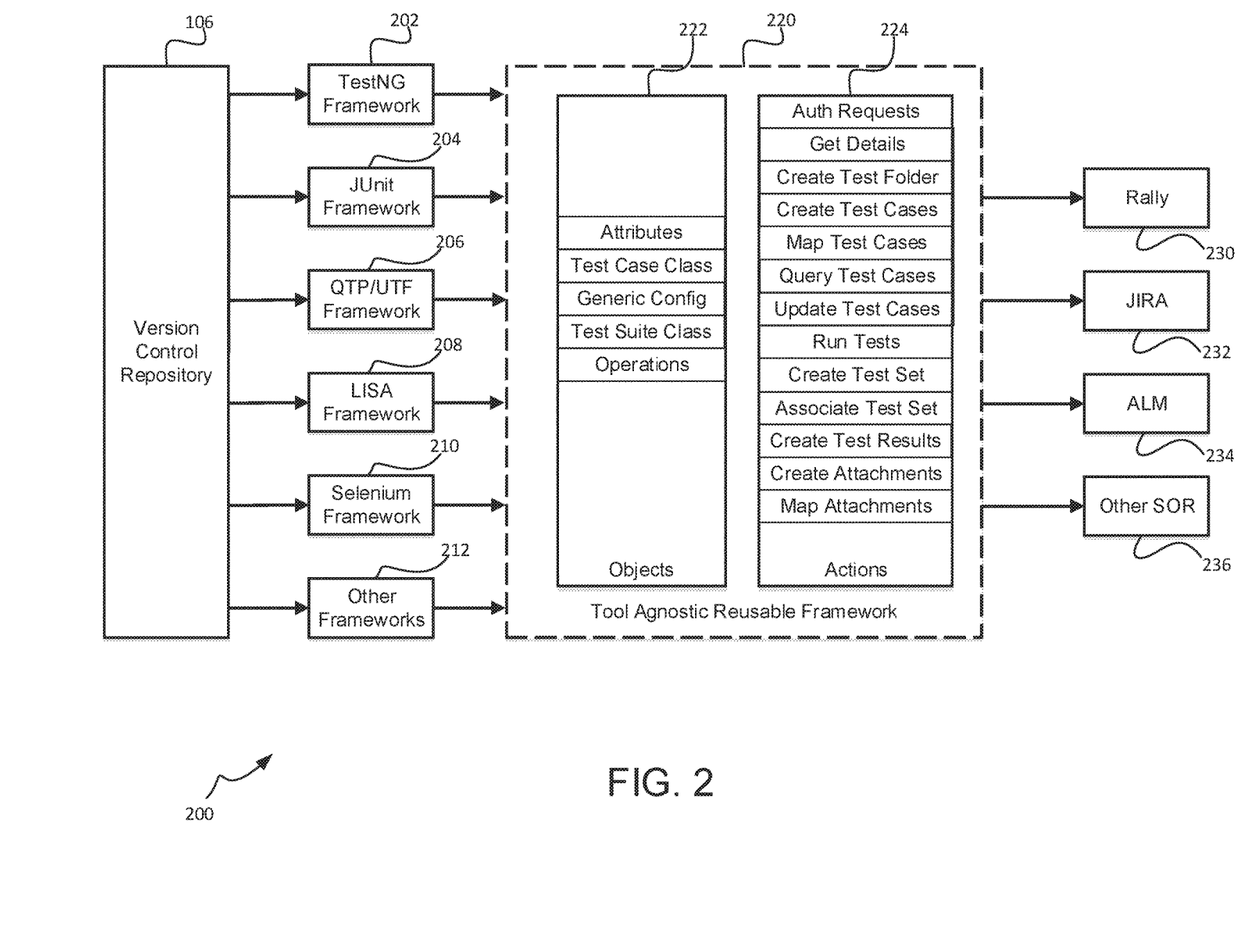
FIG. 2 illustrates exemplary system architecture for a test case management system, in accordance with various embodiments.

With reference to FIG. 2, exemplary system architecture 200 is shown for managing test cases written for a variety of testing frameworks, in accordance with various embodiments. Developers may write test code and input conditions using developer console 102 that are stored in version control repository 106, as described above. Version control repository 106 may be scanned to detect new and/or updated code and/or input conditions. The code and/or input conditions may be directed to the appropriate test framework/tool for execution. For example, code and/or input conditions from version control repository 106 may be input into a TestNG tool 202, a Junit tool 204, a QTP and/or UTF tool 206, a LISA tool 208, a selenium tool 210, and/or another test framework for which the code and/or input conditions were written.

In various embodiments, tool agnostic framework 220 may be configured to read the code and/or input conditions. Tool agnostic framework 220 may be capable of detecting and/or receiving objects 222 and interacting with an SOR using actions 224. Objects may be extracted from the code and/or input conditions read from version control repository 106. Code from version control repository 106 may be parsed and/or read as code for the appropriate test framework and the relevant data may be extracted from the code and/or files and pushed into one or more system of record, for example, using an application programming interface (API) to complete actions 224. An API may be used to address the computer-based problem of electronic communication between one or more applications running on one or more computing devices.

In various embodiments, objects may include programming language objects (e.g., java objects) such as attributes, test case classes, generic configuration, test suite classes, and operations. Attributes may include, for example, user story, workspace, project, iteration, test case name, test case description, test steps, test set name, test case result status, attachment, and/or other attributes associated with a test case. Generic configuration may include configuration parameters such as test case path and/or test case result path to indicate storage locations for test case input and output files, respectively. Operations may include creating a test case in an SOR, updating a test case in an SOR, running a test, and/or updating test case results in an SOR. The test case in an SOR may be associated with a user story in that the test case may test the code written to test the user story. The user story, thus, may be used identify a discrete segment of test cases in various SOR or vice versa.

Tool agnostic framework 220 may use API calls to interact with an SOR such as, for example, a Rally™ management system 230, a JIRA® management system 232, an application lifecycle management (ALM) system 234, or other suitable software testing management software 236 suitable for integration into an SOR running on a test management server 104. For example, tool agnostic framework 220 may use API calls to create custom methods such as make authorization requests, get workspace details, get project details, get story details, get iteration details, create test folders, create test cases, map test cases to user story and/or test folder, query test cases, update test cases, run tests, create test sets, associate test sets with test cases, associate test sets with iterations, create test case results, create attachments, and/or map attachments with test case results. These API's are exposed by the SOR and may use custom methods to consume these APIs to interact with SOR based API requirements. Actions 224 may be completed using objects 222 as parameters in API calls where appropriate. Tool agnostic framework may run as a process on developer console 102, test management server 104, a continuous integration server (e.g., Jenkins), and/or another computing device.

As will be described in greater detail below, test management system 100 is a loosely coupled solution that can create, update, execute, and upload results of tests independently of other steps. Test management system 100 comprises the tool agnostic framework 220 configured for API integration. The code for tool agnostic framework 220 may be reusable code, hence the effort to add a new tool or plugging with the tool agnostic framework 220 is greatly simplified. Test management system 100 may use the test driven development (TDD) approach and have high probability of developer acceptance and more DEV-QA collaboration. Tool agnostic framework 220 is highly adaptable, as it uses tools already created to run the test cases and does not change currently written projects.

In various embodiments, test management system 100 may use Maven for builds. A continuous integration tool like Jenkins may orchestrate builds, deployment, and testing.

The continuous integration tool uses build tools (e.g., Maven) with details available at https://maven.apache.org) to compile code and create binaries for execution. A test management system may trigger operation such as create testcases, for example, using Maven Profiles. Continuous integration tools may thus call Maven profiles using jobs at any stage of orchestration (generally in test phase) and complete operations. Test management system 100 may also use various maven plugins such as, for example, surefire, shade, and exec-maven. Test management system 100 has configurable settings using properties files. The test management system may be deployed as a pluggable utility, for example, on developer console 102, which can be plugged in as a jar file. Test management system supports single sign-on (SSO) authentication in addition to default authentication mechanisms. Test management system 100 also supports various file types including excel, xml, html, and PF (in pipeline) to read test cases and/or test results. Developer console 102 may trigger the tool agnostic framework 220 from maven profiles, batch, command line options, or scripts, for example. Tool agnostic framework 220 also integrates seamlessly with version control repository 106 to get code updates automatically (e.g., using the command line) before completing an operation.

Figure 3:
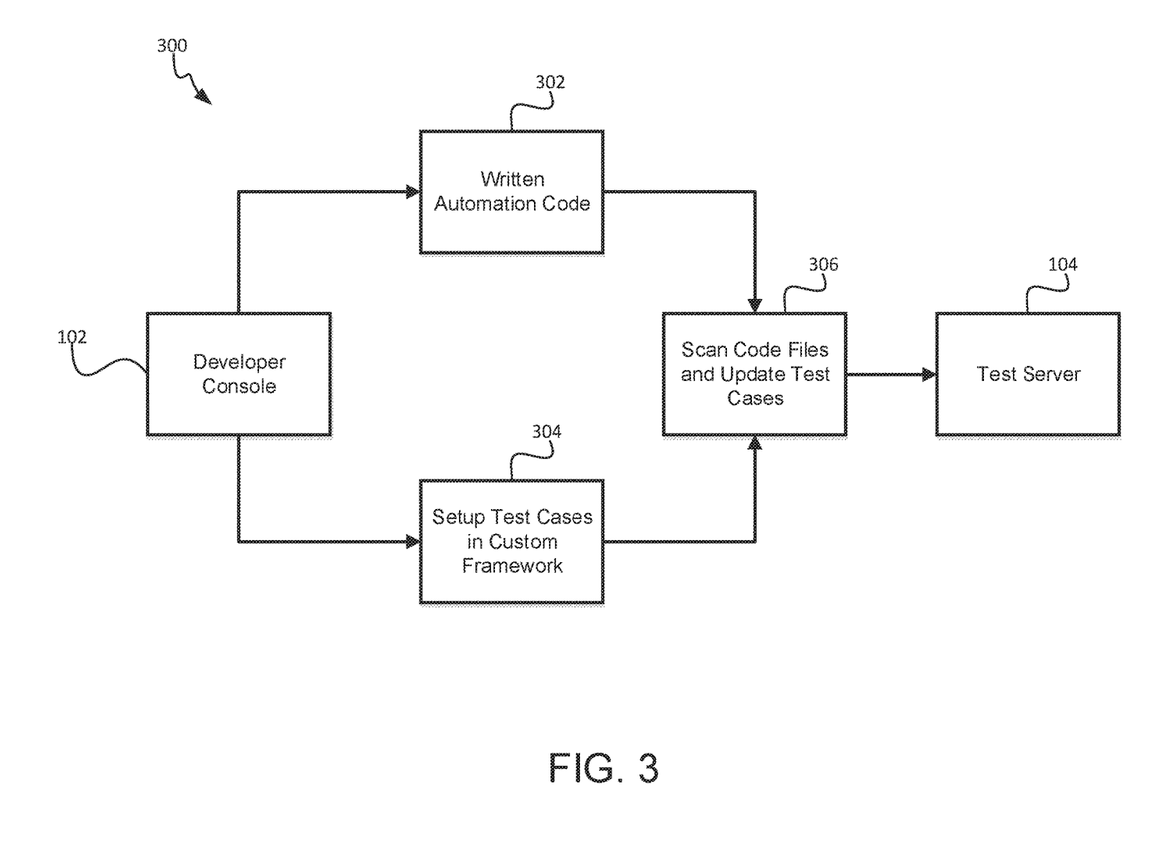
FIG. 3 illustrates an exemplary process for updating test cases using a test case management framework, in accordance with various embodiments.

Referring now to FIG. 3, an exemplary use case 300 is illustrated for creating and updating test cases in a system of record using a tool agnostic framework 220, in accordance with various embodiments. A developer may use developer console 102 to generate test cases written and test automation code (Step 302). Test automation code may include code and input conditions, as described herein, for execution using a test framework. The written code and/or input conditions may be stored in a version control repository 106. The developer may also use developer console 102 to setup test cases in a custom framework (Step 304). In a custom framework, the developer may not be working with prepackaged test frameworks with previously known structures, libraries, functions, etc. The code and/or input conditions written for a custom framework may be parsed using a known structure of the custom framework (e.g., by writing a custom parsing tool). The code and/or input conditions may also be parsed using one or more existing parsing tools for known test frameworks to extract objects 222.

In various embodiments, and as described herein, tool agnostic framework 220 may be configured to scan the code and/or custom frameworks from a version control repository 106. The scan may be triggered by a poll of version control repository 106 by a continuous integration server (e.g., Jenkins) indicating that a change has occurred since the last update. The scan may also be triggered by a developer, for example, issuing a command at a command line, committing his/her code in version control repository 106, and/or pressing a launch button in an interface. Tool agnostic framework 220 may create and/or upload the associated test cases and ancillary results (Step 306). The results may be uploaded to test management server 104 and stored in an SOR running on test management server 104, a continuous integration server, or locally from a developer console.

Thus, in use case 300, a developer may cause the system to create test cases and updates by simply writing automation code and triggering tool agnostic framework 220 to scan the code. The developer may skip or minimize the traditional step of uploading test cases into a system of record using a plugin or add-in for the system of record. With respect to creating test cases in an SOR, the developer may also forego the steps of manually creating test cases and/or associated test files (e.g., excel. CSV, flat file, or other file formats).

Figure 4:
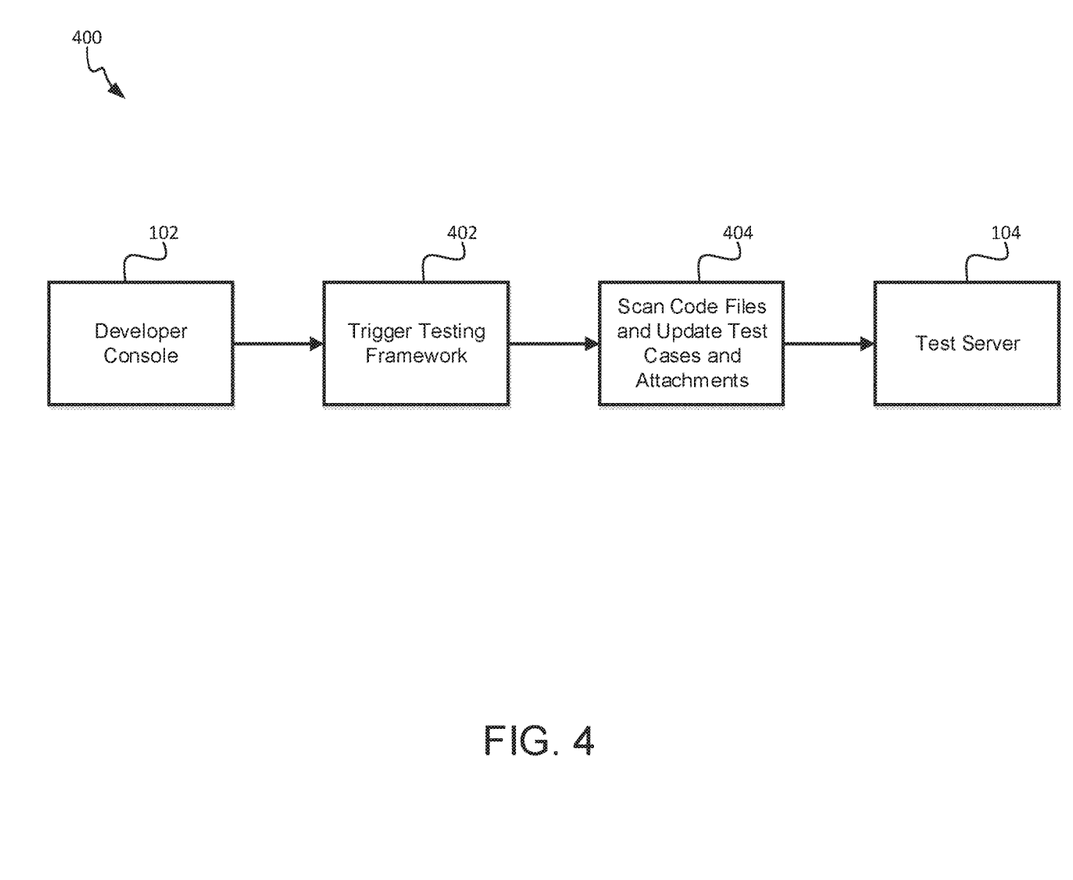
FIG. 4 illustrates an exemplary process for executing test cases and generating results, in accordance with various embodiments.

FIG. 4 illustrates an exemplary use case 400 for executing and updating test results in a system of record using a tool agnostic framework 220, in accordance with various embodiments. A developer may use developer console 102 to trigger the tool agnostic framework 220 (Step 402). Tool agnostic framework 220 may be triggered by instructing the framework to poll version control repository 106 at regular intervals or to execute a test case at a predetermined time. Tool agnostic framework 220 may also be triggered by issuing a command from a command line or launching a test using a graphical interface.

In various embodiments, tool agnostic framework 220 may scan test automation code files and update test cases, test cases results and attachments (Step 404). The code scan may include retrieving the latest copies of code available in version control repository 106. Tool agnostic framework 220 may parse the code for objects 222 and interact with a system of record using actions 224. For example, tool agnostic framework 220 may execute test runs in a predetermined test framework by issuing a corresponding command suitable for a command line. Tool agnostic framework 220 may execute the tests. Tool agnostic framework 220 may capture any screen shots, output results, and general test results, which may be uploaded to a SOR by updating the executed test case and test case results. Tool agnostic framework 220 may also return the results and attachments to developer console 102 for review in a dashboard, an output file, an email, etc.

Thus, in use case 400, a developer may cause the test management system to execute test cases and update results by simply triggering tool agnostic framework 220 to execute tests and/or to update test cases and results. The developer may skip or minimize the traditional steps of manually executing test cases. The developer may also forego or minimize the traditional steps of manually saving attachments (e.g., screen shots), manually opening test cases in an SOR, and manually updating the test cases and uploading the attachments in an SOR. In that regard, tool agnostic framework 220 and test management system 100 address the computer-based problem of software testing and test management using an integrated approach.

Figure 5:
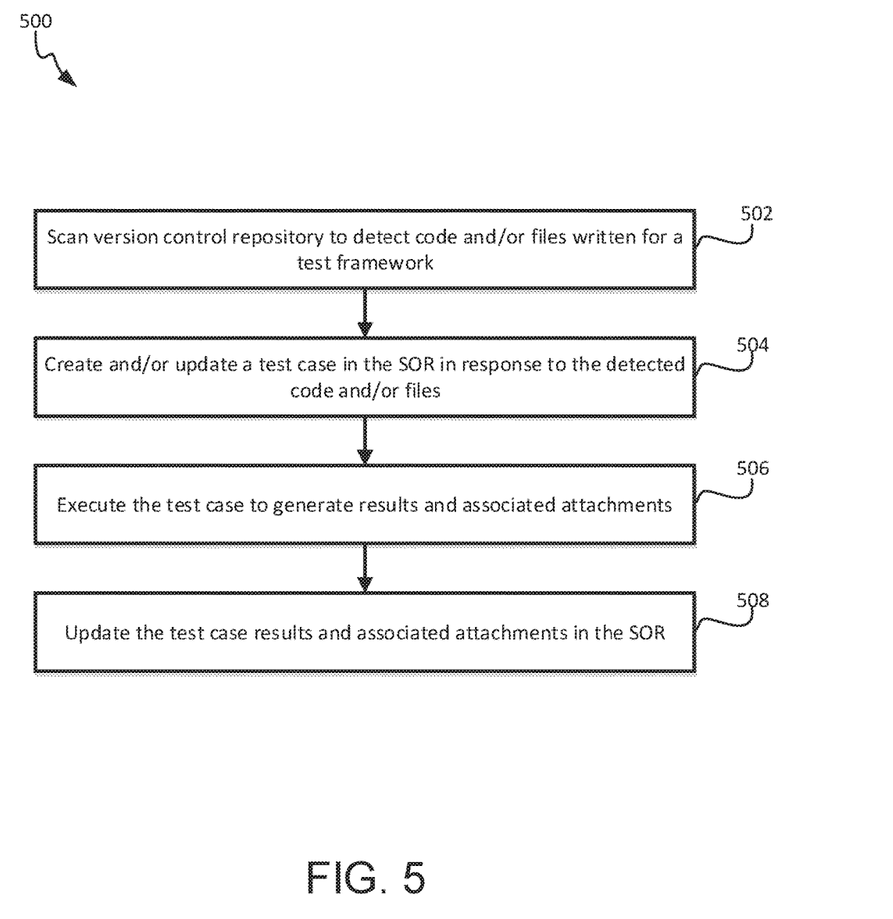
FIG. 5 illustrates an exemplary process for execution by a test case management system to create, update, and/or execute test cases written for various testing frameworks, in accordance with various embodiments.

Referring now to FIG. 5, an exemplary process 500 is shown for test case management using tool agnostic framework 220, in accordance with various embodiments. Tool agnostic framework 220 may scan version control repository 106 to detect new and/or updated code written on a developer console 102 for execution in a test framework (Step 502). Tool agnostic framework 220 may scan version control repository 106 by reading a list of last modified timestamps to detect any timestamps newer than the last scan time. Tool agnostic framework 220 may also scan version control repository 106 by comparing current versions of files and code to the previously retrieved versions. Tool agnostic framework 220 may further scan version control repository 106 by retrieving the latest code and/or files associated with a test case and overwriting previous results. In response to detecting a new and/or updated file, tool agnostic framework 220 may download and/or retrieve from version control repository 106 the new or updated files.

In various embodiments, tool agnostic framework 220 may create and/or update a test case in the SOR in response to the detected test automation code and/or files (Step 504). Tool agnostic framework 220 may create a new test case in response to detecting new test automation code and/or files. The new test case may be created by extracting the desired details and information (e.g., objects 222 discussed herein) and interacting with the SOR to create the test case (e.g., using actions 224 discussed herein). In that regard, tool agnostic framework 220 may be configured to create test cases in the system of record without a developer manually creating the test case. Tool agnostic framework 220 may update an existing test case in response to detecting updated code and/or files in version control repository 106. The test case may be updated in a manner similar to creation, described herein, but by overwriting existing test data, code, input conditions, and/or flags currently in the SOR.

In various embodiments, tool agnostic framework 220 may execute the test case to generate results and associated attachments (Step 506). Tool agnostic framework 220 may execute the test case by generating a command line command configured to execute the test case in its native test framework (e.g., JUnit, TestNG, etc. as described above). Tool agnostic framework 220 may also be configured to integrate the libraries, functions, and tools present in the native test framework into tool agnostic framework 220, for example, using a jar file, and execute the test cases directly to derive test results. Tool agnostic framework 220 may render, capture, generate, or otherwise receive attachments associated with the test results (e.g., screen shots of a user interface).

In various embodiments, tool agnostic framework 220 may update the test case results and associated attachments in the SOR (Step 508). Tool agnostic framework 220 may update the test case results and associated attachments in the SOR using objects 222 and/or actions 224 available via API for interacting with the SOR. Tool agnostic framework 220 may thus keep results and attachments up-to-date in the SOR for audit purposes without a developer manually executing tests, uploading results, capturing attachments, and uploading the attachments. As a result, tool agnostic framework 220 may increase the efficiency and completeness of the testing process by ensuring that results and attachments are updated regularly.

Test management system 100 described herein supports multiple testing frameworks such as, for example, Selenium TestNG, Junit, QTP, LISA, and Protractor, among others. In that regard, test management system can handle various types of testing such as, for example, unit, functional, regression, API, headless, and SIT testing. Tool agnostic framework 220 can create tests in an SOR, update the tests in the SOR, execute tests, and upload test results into the SOR including screen shots and video captures. Thus, test management system 100 includes a fully automated mechanism to scan the code/tests stored in a version control repository 106 and create/update the appropriate test cases in an SOR.

In various embodiments, the system and method may include alerting a subscriber when their computer is offline. The system may include generating customized information and alerting a remote subscriber that the information can be accessed from their computer. The alerts are generated by filtering received information, building information alerts and formatting the alerts into data blocks based upon subscriber preference information. The data blocks are transmitted to the subscriber's wireless device which, when connected to the computer, causes the computer to auto-launch an application to display the information alert and provide access to more detailed information about the information alert. More particularly, the method may comprise providing a viewer application to a subscriber for installation on the remote subscriber computer; receiving information at a transmission server sent from a data source over the Internet, the transmission server comprising a microprocessor and a memory that stores the remote subscriber's preferences for information format, destination address, specified information, and transmission schedule, wherein the microprocessor filters the received information by comparing the received information to the specified information; generates an information alert from the filtered information that contains a name, a price and a universal resource locator (URL), which specifies the location of the data source; formats the information alert into data blocks according to said information format; and transmits the formatted information alert over a wireless communication channel to a wireless device associated with a subscriber based upon the destination address and transmission schedule, wherein the alert activates the application to cause the information alert to display on the remote subscriber computer and to enable connection via the URL to the data source over the Internet when the wireless device is locally connected to the remote subscriber computer and the remote subscriber computer comes online.

In various embodiments, the system and method may include a graphical user interface for dynamically relocating/rescaling obscured textual information of an underlying window to become automatically viewable to the user. By permitting textual information to be dynamically relocated based on an overlap condition, the computer's ability to display information is improved. More particularly, the method for dynamically relocating textual information within an underlying window displayed in a graphical user interface may comprise displaying a first window containing textual information in a first format within a graphical user interface on a computer screen; displaying a second window within the graphical user interface; constantly monitoring the boundaries of the first window and the second window to detect an overlap condition where the second window overlaps the first window such that the textual information in the first window is obscured from a user's view; determining the textual information would not be completely viewable if relocated to an unobstructed portion of the first window; calculating a first measure of the area of the first window and a second measure of the area of the unobstructed portion of the first window; calculating a scaling factor which is proportional to the difference between the first measure and the second measure; scaling the textual information based upon the scaling factor; automatically relocating the scaled textual information, by a processor, to the unobscured portion of the first window in a second format during an overlap condition so that the entire scaled textual information is viewable on the computer screen by the user; and automatically returning the relocated scaled textual information, by the processor, to the first format within the first window when the overlap condition no longer exists.

In various embodiments, the system may also include isolating and removing malicious code from electronic messages (e.g., email) to prevent a computer from being compromised, for example by being infected with a computer virus. The system may scan electronic communications for malicious computer code and clean the electronic communication before it may initiate malicious acts. The system operates by physically isolating a received electronic communication in a "quarantine" sector of the computer memory. A quarantine sector is a memory sector created by the computer's operating system such that files stored in that sector are not permitted to act on files outside that sector. When a communication containing malicious code is stored in the quarantine sector, the data contained within the communication is compared to malicious code-indicative patterns stored within a signature database. The presence of a particular malicious code-indicative pattern indicates the nature of the malicious code. The signature database further includes code markers that represent the beginning and end points of the malicious code. The malicious code is extracted from malicious code-containing communication. An extraction routine is run by a file parsing component of the processing unit. The file parsing routine performs the following operations; scan the communication for the identified beginning malicious code marker; flag each scanned byte between the beginning marker and the successive end malicious code marker; continue scanning until no further beginning malicious code marker is found; and create a new data file by sequentially copying all non-flagged data bytes into the new file, which forms a sanitized communication file. The new, sanitized communication is transferred to a non-quarantine sector of the computer memory. Subsequently, all data on the quarantine sector is erased. More particularly, the system includes a method for protecting a computer from an electronic communication containing malicious code by receiving an electronic communication containing malicious code in a computer with a memory having a boot sector, a quarantine sector and a non-quarantine sector; storing the communication in the quarantine sector of the memory of the computer, wherein the quarantine sector is isolated from the boot and the non-quarantine sector in the computer memory, where code in the quarantine sector is prevented from performing write actions on other memory sectors; extracting, via file parsing, the malicious code from the electronic communication to create a sanitized electronic communication, wherein the extracting comprises scanning the communication for an identified beginning malicious code marker, flagging each scanned byte between the beginning marker and a successive end malicious code marker, continuing scanning until no further beginning malicious code marker is found, and creating a new data file by sequentially copying all non-flagged data bytes into a new file that forms a sanitized communication file; transferring the sanitized electronic communication to the non-quarantine sector of the memory and deleting all data remaining in the quarantine sector.

In various embodiments, the system may also address the problem of retaining control over customers during affiliate purchase transactions, using a system for co-marketing the "look and feel" of the host web page with the product-related content information of the advertising merchant's web page. The system can be operated by a third-party) outsource provider, who acts as a broker between multiple hosts and merchants. Prior to implementation, a host places links to a merchant's webpage on the host's web page. The links are associated with product-related content on the merchant's web page. Additionally, the outsource provider system stores the "look and feel" information from each host's web pages in a computer data store, which is coupled to a computer server. The "look and feel" information includes visually perceptible elements such as logos, colors, page layout, navigation system, frames, mouse-over effects or other elements that are consistent through some or all of each host's respective web pages. A customer who clicks on an advertising link is not transported from the host web page to the merchant's web page, but instead is redirected to a composite web page that combines product information associated with the selected item and visually perceptible elements of the host web page. The outsource provider's server responds by first identifying the host web page where the link has been selected and retrieving the corresponding stored "look and feel" information. The server constructs a composite web page using the retrieved "look and feel" information of the host web page, with the product-related content embedded within it, so that the composite web page is visually perceived by the customer as associated with the host web page. The server transmits and presents this composite web page to the customer so that she effectively remains on the host web page to purchase the item without being redirected to the third party merchant affiliate. Because such composite pages are visually perceived by the customer as associated with the host web page, they give the customer the impression that she is viewing pages served by the host. Further, the customer is able to purchase the item without being redirected to the third party merchant affiliate, thereby allowing the host to retain control over the customer. This system enables the host to receive the same advertising revenue streams as before but without the loss of visitor traffic and potential customers. More particularly, the system may be useful in an outsource provider serving web pages offering commercial opportunities. The computer store containing data, for each of a plurality of first web pages, defining a plurality of visually perceptible elements, which visually perceptible elements correspond to the plurality of first web pages; wherein each of the first web pages belongs to one of a plurality of web page owners; wherein each of the first web pages displays at least one active link associated with a commerce object associated with a buying opportunity of a selected one of a plurality of merchants; and wherein the selected merchant, the outsource provider, and the owner of the first web page displaying the associated link are each third parties with respect to one other; a computer server at the outsource provider, which computer server is coupled to the computer store and programmed to: receive from the web browser of a computer user a signal indicating activation of one of the links displayed by one of the first web pages; automatically identify as the source page the one of the first web pages on which the link has been activated; in response to identification of the source page, automatically retrieve the stored data corresponding to the source page; and using the data retrieved, automatically generate and transmit to the web browser a second web page that displays: information associated with the commerce object associated with the link that has been activated, and the plurality of visually perceptible elements visually corresponding to the source page.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Terms and phrases similar to "associate" and/or "associating" may include tagging, flagging, correlating, using a look-up table or any other method or system for indicating or creating a relationship between elements, such as, for example, (i) a transaction account and (ii) an item (e.g., offer, reward, discount) and/or digital channel. Moreover, the associating may occur at any point, in response to any suitable action, event, or period. The associating may occur at pre-determined intervals, periodic, randomly, once, more than once, or in response to a suitable request or action. Any of the information may be distributed and/or accessed via a software enabled link, wherein the link may be sent via an email, text, post, social network input and/or any other method known in the art.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a computing system including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, OS2, UNIX®, LINUX®, SOLARIS®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general-purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross-over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to refer generally to media such as, for example, removable storage drives, hard disks, solid-state drives, CD media, or DVD media. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine to perform the functions described herein will be apparent to persons skilled in the relevant art(s).

In various embodiments, the systems described herein may include application servers (e.g. WEB SPHERE, WEB LOGIC, JBOSS). For example, tool agnostic framework 220 may include a graphical and/or command line interface. A graphical interface may be developed as a web-based interface. In various embodiments, the server may include web servers (e.g. APACHE, IIS, GWS, SUN JAVA® SYSTEM WEB SERVER).

In that regard, the computers discussed herein may provide a suitable website or other Internet-based graphical user interface which is accessible by users. In one embodiment, the MICROSOFT® INTERNET INFORMATION SERVICES® (IIS), MICROSOFT® Transaction Server (MTS), and MICROSOFT® SQL Server, are used in conjunction with the MICROSOFT® operating system. MICROSOFT® NT web server software, a MICROSOFT® SQL Server database system, and a MICROSOFT® Commerce Server. Additionally, components such as Access or MICROSOFT® SQL Server, ORACLE®, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, and/or Python programming languages.

Furthermore, any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® APPLE® ts, JAVASCRIPT, active server pages (ASP), common gateway interface scripts (CGI), extensible markup language (XML), dynamic HTML, cascading style sheets (CSS), AJAX (Asynchronous JAVASCRIPT And XML), helper applications, plug-ins, and the like. A server may include a web service that receives a request from a web server, the request including a URL and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., Alex Nghiem, IT Web Services: A Roadmap for the Enterprise (2003), hereby incorporated by reference.

Practitioners will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In various embodiments, access is through a network or the Internet through a commercially available web-browser software package.

As those skilled in the art will appreciate, a web client includes an operating system (e.g., WINDOWS®/CE/Mobile, OS2, UNIX®, LINUX®, SOLARIS®, MacOS, etc.) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In various embodiments, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., IPHONE®, BLACKBERRY®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, APPLE® talk, IP-6, NetBIOS®, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, Dilip Naik, Internet Standards and Protocols (1998); JAVA® 2 Complete, various authors, (Sybex 1999); Deborah Ray and Eric Ray, Mastering HTML 4.0 (1997); and Loshin, TCP/IP Clearly Explained (1997) and David Gourley and Brian Totty, HTTP, The Definitive Guide (2002), the contents of which are hereby incorporated by reference.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/publications/nistpubs/800-145/SP800-145.pdf (last visited June 2012), which is hereby incorporated by reference in its entirety.

Any databases discussed herein may include relational, hierarchical, graphical, or object-oriented structure and/or any other database configurations. Common database products that may be used to implement the databases include DB2 by IBM® (Armonk, N.Y.), various database products available from ORACLE® Corporation (Redwood Shores, Calif.), MICROSOFT®, Access®, or MICROSOFT® SQL Server®, by MICROSOFT® Corporation (Redmond, Wash.), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database-tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Practitioners will also appreciate that there are a number of methods for displaying data within a document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

As will be appreciated by one of ordinary skill in the art, the system may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT, VBScript, Macromedia Cold Fusion, COBOL, MICROSOFT® Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "JAVA® Cryptography" by Jonathan Knudson, published by O'Reilly & Associates (1998); (3) "Cryptography & Network Security: Principles & Practice" by William Stallings, published by Prentice Hall; all of which are hereby incorporated by reference.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general-purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may refer to user WINDOWS®, webpages, websites, web forms, prompts, etc. Practitioners will appreciate that the illustrated steps described herein may comprise in any number of configurations including the use of WINDOWS®, webpages, web forms, popup WINDOWS®, prompts and the like. It should be further appreciated that the multiple steps as illustrated and described may be combined into single webpages and/or WINDOWS® but have been expanded for the sake of simplicity. In other cases, steps illustrated and described as single process steps may be separated into multiple webpages and/or WINDOWS® but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment. B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method comprising:
   scanning, by a test management system, a version control repository and source code management system to detect at least one of a first code, a test or a first file written for a first test framework;
   reading, by the test management system, input conditions from the version control repository;
   parsing, by the test management system and using an application programming interface (API), at least one of the first code, the test or the first file;
   extracting, by the test management system, programming language objects from at least one of the first code, the test or the first file;
   extracting, by the test management system and using an API, relevant data from at least one of the first code, the test or the first file;
   creating, by the test management system, a first test case in a system of record (SOR) in response to detecting at least one of the first code, the test or the first file;
   updating, by the test management system and using a version control repository, the first test case with the current version of at least one of the first code, the test or the first file, in response to receiving a poll command from a developer console indicating automation codes and files stored in the source code management system have changed;
   mapping, by the test management system, the first test case to at least one of requirements or user stories;
   scanning, by the test management system, the version control repository to detect at least one of a second code or a second file written for a second test framework, wherein the second test framework is different from the first test framework;
   creating, by the test management system, a second test case in the SOR in response to detecting at least one of the second code or the second file; and
   raising, by the test management system and in the SOR, a defect associated with the first test case and the second test case.

2. The method of claim 1, further comprising
   executing, by the test management system, the first test case to generate a first result; and uploading, by the test management system, the first result to the SOR.

3. The method of claim 2, further comprising capturing, by the test management system, at least one of an image or a video from the executing the first test case.

4. The method of claim 3, further comprising uploading, by the test management system, at least one of the image or the video to the SOR for association with the first test case.

5. The method of claim 1, wherein the test management system comprises a tool agnostic framework configured to integrate with a plurality of test frameworks.

6. The method of claim 5, further comprising interacting, by the test management system using the tool agnostic framework, with the SOR using an API call.

7. The method of claim 5, further comprising:
executing, by the test management system using the tool agnostic framework, the first test case from at least one of a command line, a script, or a profile;
capturing, by the test management system using the tool agnostic framework, screen shots, output results, and general test results; and
uploading, by the test management system using the tool agnostic framework, the screen shots, the output results, and the general test results, to the SOR by updating the executed first test case and results of the first test case.

8. The method of claim 1, wherein the programming language objects include attributes, test case classes, generic configuration, test suite classes, and operations.

9. The method of claim 1, wherein the programming language objects include attributes, and wherein the attributes include user story, workspace, project, iteration, a name of the first test case, a description of the first test case, test steps, test set name, result status of the first test case and attachment.

10. The method of claim 1, wherein the programming language objects include generic configuration, and wherein the generic configuration includes configuration parameters, wherein the configuration parameters include path of the first test case to indicate storage locations for input for the first test case and a result path for the first test case to indicate storage locations for output files.

11. The method of claim 1, wherein the programming language objects include operations, wherein the operations include creating the first test case in the SOR, updating the first test case in the SOR, running a test, and updating results for the first test case in the SOR.

12. The method of claim 1, wherein the first test case in the SOR is associated with a user story in that the first test case tests the code written to test the user story, and wherein the user story identifies a discrete segment of the first test case in various of the SOR.

13. The method of claim 1, wherein the scanning occurs in unit testing, system integration testing, end-to-end testing, and acceptance testing.

14. A computer-based system, comprising:
a processor; and
a tangible, non-transitory memory configured to communicate with the processor, the tangible, non-transitory memory having instructions stored thereon that, in response to execution by the processor, cause the processor to perform operations comprising:
scanning, by the processor, a version control repository and source code management system to detect at least one of a first code, a test or a first file written for a first test framework;
reading, by the processor, input conditions from the version control repository;
parsing, by the processor and using an application programming interface (API), at least one of the first code, the test or the first file;
extracting, by the processor, programming language objects from at least one of the first code, the test or the first file;
extracting, by the processor and using an API, relevant data from at least one of the first code, the test or the first file;
creating, by the processor, a first test case in a system of record (SOR) in response to detecting at least one of the first code, the test or the first file;
updating, by the processor and using a version control repository, the first test case with the current version of at least one of the first code, the test or the first file, in response to receiving a poll command from a developer console indicating automation codes and files stored in the source code management system have changed;
mapping, by the processor, the first test case to at least one of requirements or user stories;
scanning, by the processor, the version control repository to detect at least one of a second code or a second file written for a second test framework, wherein the second test framework is different from the first test framework;
creating, by the processor, a second test case in the SOR in response to detecting at least one of the second code or the second file; and
raising, by the processor and in the SOR, a defect associated with the first test case and the second test case.

15. An article of manufacture including a non-transitory, tangible computer readable storage medium having instructions stored thereon that, in response to execution by a test management system, cause the test management system to perform operations comprising:
scanning, by the test management system, a version control repository and source code management system to detect at least one of a first code, a test or a first file written for a first test framework;
reading, by the test management system, input conditions from the version control repository;
parsing, by the test management system and using an application programming interface (API), at least one of the first code, the test or the first file;
extracting, by the test management system, programming language objects from at least one of the first code, the test or the first file;
extracting, by the test management system and using an API, relevant data from at least one of the first code, the test or the first file;
creating, by the test management system, a first test case in a system of record (SOR) in response to detecting at least one of the first code, the test or the first file;
updating, by the test management system and using a version control repository, the first test case with the current version of at least one of the first code, the test or the first file, in response to receiving a poll command from a developer console indicating automation codes and files stored in the source code management system have changed;
mapping, by the test management system, the first test case to at least one of requirements or user stories;
scanning, by the test management system, the version control repository to detect at least one of a second code or a second file written for a second test framework, wherein the second test framework is different from the first test framework;

creating, by the test management system, a second test case in the SOR in response to detecting at least one of the second code or the second file; and raising, by the test management system and in the SOR, a defect associated with the first test case and the second test case.

16. The article of claim 15, further comprising executing, by the test management system, the first test case to generate a first result; and uploading, by the test management system, the first result to the SOR.

17. The article of claim 16, further comprising uploading, by the test management system, at least one of an image or a video to the SOR for association with the first test case, wherein at least one of the image or the video are captured from the executing the first test case.

18. The article of claim 15, wherein the test management system comprises a tool agnostic framework configured to integrate with a plurality of test frameworks.

19. The article of claim 18, further comprising interacting, by the test management system using the tool agnostic framework, with the SOR using an API call.

20. The article of claim 18, further comprising:

executing, by the test management system using the tool agnostic framework, the first test case from at least one of a command line, a script, or a profile;

capturing, by the test management system using the tool agnostic framework, screen shots, output results, and general test results; and uploading, by the test management system using the tool agnostic framework, the screen shots, the output results, and the general test results, to the SOR by updating the executed first test case and results of the first test case.

\* \* \* \* \*